(12) United States Patent
Sugano

(10) Patent No.: US 11,640,588 B2
(45) Date of Patent: May 2, 2023

(54) AUTOMATED VALET PARKING SYSTEM AND SERVICE PROVIDING METHOD

(71) Applicant: Toyota Jidosha Kabushiki Kaisha, Toyota Aichi-ken (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 17/184,783

(22) Filed: Feb. 25, 2021

(65) Prior Publication Data

US 2021/0316718 A1    Oct. 14, 2021

(30) Foreign Application Priority Data

Apr. 8, 2020    (JP) .............................. JP2020-069990

(51) Int. Cl.
*B60W 30/06*    (2006.01)
*B60W 30/18*    (2012.01)
*B60W 10/18*    (2012.01)
*G06Q 10/00*    (2012.01)
*G08G 1/017*    (2006.01)
(Continued)

(52) U.S. Cl.
CPC ............. *G06Q 10/20* (2013.01); *B60W 10/18* (2013.01); *B60W 30/06* (2013.01); *B60W 30/18109* (2013.01); *G06V 10/764* (2022.01); *G06V 20/52* (2022.01); *G06V 20/54* (2022.01);
(Continued)

(58) Field of Classification Search
CPC ................. B60W 30/06; B60W 10/18; B60W 30/18109; B60W 2556/10; G06Q 10/20; G06V 20/54; G06V 2201/08; G06V 10/764; G06V 20/52; G06V 20/56; G08G 1/017; G08G 1/144; G08G 1/146; G08G 1/14;
(Continued)

(56) References Cited

U.S. PATENT DOCUMENTS 10,409,290 B2 *   9/2019   Mielenz ................. B60W 30/06
10,730,556 B2 *   8/2020   Nicodemus ........ B62D 15/0285
(Continued)

FOREIGN PATENT DOCUMENTS

CN    109895757 A    6/2019
CN    110211418 A    9/2019
(Continued)

*Primary Examiner* — Daryl C Pope
(74) *Attorney, Agent, or Firm* — Dinsmore & Shohl LLP

(57) ABSTRACT

An automated valet parking system provides an automated valet parking service in a parking lot. A vehicle supporting the automated valet parking service executes braking control so as to automatically decelerate and stop before a target stop position in the parking lot. Braking result information indicates a braking distance until the vehicle is stopped by the braking control or an error distance between the target stop position and an actual stop position. The automated valet parking system determines whether or not the braking distance or the error distance deviates from an acceptable range. When the braking distance or the error distance deviates from the acceptable range, the automated valet parking system decides that an abnormality occurs in a braking device or a tire of the vehicle and transmits notification information notifying the abnormality occurrence to a terminal device operated by a user of the vehicle.

8 Claims, 14 Drawing Sheets

(51) Int. Cl.
  *G06V 20/54* (2022.01)
  *G06Q 10/20* (2023.01)
  *G06V 10/764* (2022.01)
  *G06V 20/52* (2022.01)
  *G06V 20/56* (2022.01)

(52) U.S. Cl.
  CPC ............. *G06V 20/56* (2022.01); *G08G 1/017* (2013.01); *B60W 2556/10* (2020.02); *G06V 2201/08* (2022.01)

(58) Field of Classification Search
  CPC . G08G 1/0969; B62D 15/0285; G06K 9/6284
  See application file for complete search history.

(56) References Cited

U.S. PATENT DOCUMENTS

| | | | |
|---|---|---|---|
| 10,857,941 B2 | 12/2020 | Yoshizaki et al. | |
| 10,922,561 B2 | 2/2021 | Ozawa et al. | |
| 11,069,085 B2 | 7/2021 | Walls et al. | |
| 11,087,384 B2 | 8/2021 | Nishimura | |
| 11,094,197 B2 | 8/2021 | Urano et al. | |
| 11,100,433 B2 * | 8/2021 | Voelz | B60W 30/06 |
| 11,106,218 B2 * | 8/2021 | Levinson | G05D 1/0278 |
| 11,176,503 B2 | 11/2021 | Kobayashi et al. | |
| 11,183,058 B2 | 11/2021 | Kaneko et al. | |
| 11,192,555 B2 | 12/2021 | Hashimoto et al. | |
| 11,210,948 B2 | 12/2021 | Yamashita et al. | |
| 11,235,786 B2 | 2/2022 | Kamata et al. | |
| 11,255,681 B2 | 2/2022 | Sakaguchi et al. | |
| 11,270,591 B2 | 3/2022 | Amacker et al. | |
| 11,282,388 B2 | 3/2022 | Kan et al. | |
| 11,295,556 B2 | 4/2022 | Pan et al. | |
| 11,300,417 B2 | 4/2022 | Ishiwata et al. | |
| 11,302,028 B2 | 4/2022 | Yao et al. | |
| 11,328,594 B2 | 5/2022 | Kaneko et al. | |
| 11,328,602 B2 | 5/2022 | Sherony et al. | |
| 11,352,011 B2 | 6/2022 | Kusama et al. | |
| 11,364,632 B2 | 6/2022 | Vandersmitte et al. | |
| 11,370,431 B2 | 6/2022 | Shimbo et al. | |
| 11,370,451 B2 | 6/2022 | Hirasawa et al. | |
| 11,379,762 B2 | 7/2022 | Sakurada | |
| 11,386,670 B2 | 7/2022 | Yang et al. | |
| 11,386,790 B2 | 7/2022 | Igata et al. | |
| 11,392,864 B2 | 7/2022 | Qiu et al. | |
| 11,403,940 B2 | 8/2022 | Uar et al. | |
| 11,410,198 B2 | 8/2022 | Tanabe et al. | |
| 11,414,094 B2 | 8/2022 | McGill | |
| 11,421,998 B2 | 8/2022 | Mizuno et al. | |
| 2017/0323565 A1 | 11/2017 | Nordbruch et al. | |
| 2017/0365170 A1 * | 12/2017 | Lazic | G08G 1/22 |
| 2019/0176794 A1 | 6/2019 | Pinto, IV et al. | |

FOREIGN PATENT DOCUMENTS

| | | |
|---|---|---|
| JP | 2004-291804 A | 10/2004 |
| JP | 6342076 B2 | 6/2018 |

\* cited by examiner

AUTOMATED VALET PARKING SYSTEM AND SERVICE PROVIDING METHOD

CROSS-REFERENCE TO RELATED APPLICATIONS

The present application claims priority under 35 U.S.C. § 119 to Japanese Patent Application No. 2020-069990, filed Apr. 8, 2021, of which the contents are incorporated herein by reference in their entirety.

BACKGROUND

Technical Field

The present disclosure relates to a technique for providing an automated valet parking (AVP) service in a parking lot.

Background Art

Japanese Patent No. 6342076 discloses a technique related to an automated valet parking service in a parking lot, that is, providing additional services such as cleaning, refueling, inspection, repair, and tire change to a vehicle parked in the parking lot.

Japanese Laid-Open Patent Publication No. JP-2004-291804 discloses a vehicle service providing method. When a vehicle enters a wireless communication area of a hot spot, a remaining amount of fuel of the vehicle is detected. The vehicle transmits the detection result to a facility (e.g., a gas station) via the hot spot. When the remaining amount of fuel of the vehicle is equal to or less than a predetermined amount, the facility transmits service providing information to the vehicle through the hot spot.

SUMMARY

An automated valet parking service in a parking lot is known. A vehicle supporting the automated valet parking service performs vehicle travel control such that the vehicle automatically travels at least in the parking lot. An abnormality of a braking device or a tire of the vehicle leads to decrease in deceleration performance, which in turn leads to decrease in accuracy of the vehicle travel control.

An object of the present disclosure to provide a technique that can detect an abnormality of a braking device or a tire of a vehicle supporting an automated valet parking service.

A first aspect is directed to an automated valet parking system that provides an automated valet parking service in a parking lot.

A vehicle supporting the automated valet parking service executes braking control so as to automatically decelerate and stop before a target stop position that is set in the parking lot.

Braking result information indicates a braking distance until the vehicle is stopped by the braking control or an error distance between the target stop position and an actual stop position at which the vehicle is stopped.

The automated valet parking system includes one or more processors, and one or more memories storing the braking result information.

The one or more processors determine whether or not the braking distance or the error distance indicated by the braking result information deviates from an acceptable range.

When the braking distance or the error distance indicated by the braking result information deviates from the acceptable range, the one or more processors decide that an abnormality occurs in a braking device or a tire of the vehicle and transmit notification information notifying occurrence of the abnormality to a terminal device operated by a user of the vehicle.

A second aspect is directed to a service providing method that provides an automated valet parking service in a parking lot.

A vehicle supporting the automated valet parking service executes braking control so as to automatically decelerate and stop before a target stop position that is set in the parking lot.

The service providing method includes:

(1) acquiring braking result information that indicates a braking distance until the vehicle is stopped by the braking control or an error distance between the target stop position and an actual stop position at which the vehicle is stopped;

(2) determining whether or not the braking distance or the error distance indicated by the braking result information deviates from an acceptable range; and (3) when the braking distance or the error distance indicated by the braking result information deviates from the acceptable range, deciding that an abnormality occurs in a braking device or a tire of the vehicle and transmitting notification information notifying occurrence of the abnormality to a terminal device operated by a user of the vehicle.

In a third aspect, the automated valet parking service includes an additional service that performs at least one of inspection, repair, and tire change during a period in which the vehicle is left in the parking lot. The notification information includes additional service information that proposes to perform the additional service.

According to the first and second aspects, it is possible to detect an abnormality of a braking device or a tire of the vehicle supporting the automated valet parking service. More specifically, the vehicle executes the braking control so as to automatically decelerate and stop before the target stop position that is set in the parking lot. The braking distance or the error distance, which is a result of the braking control, reflects a braking performance of the vehicle. It is therefore possible to determine whether or not an abnormality occurs in the braking performance of the vehicle, that is, whether or not an abnormality occurs in the braking device or the tire of the vehicle based on the braking distance or the error distance. More specifically, when the braking distance or the error distance deviates from an acceptable range, it is decided that an abnormality occurs in the braking device or the tire of the vehicle. In this manner, it is possible to detect the abnormality of the braking device or the tire of the vehicle.

When the abnormality of the braking device or the tire of the vehicle is detected, the notification information for notifying the occurrence of the abnormality is transmitted to the terminal device. The user of the vehicle is able to know the occurrence of the abnormality in the braking device or the tire of the vehicle through the notification information. Such the information providing service is performed as a part of the automated valet parking service and contributes to increase in convenience and usefulness of the automated valet parking service.

According to the third aspect, the automated valet parking service includes the additional service that performs at least one of inspection, repair, and tire change. The notification information includes the additional service information that proposes to perform the additional service. As a result, increase in opportunity of usage of the additional service is expected. This is preferable for a service provider. Moreover, when the additional service is used, the convenience and the usefulness of the automated valet parking service are further increased.

EMBODIMENTS

Embodiments of the present disclosure will be described with reference to the accompanying drawings.

1. Outline of Automated Valet Parking System

Figure 1:
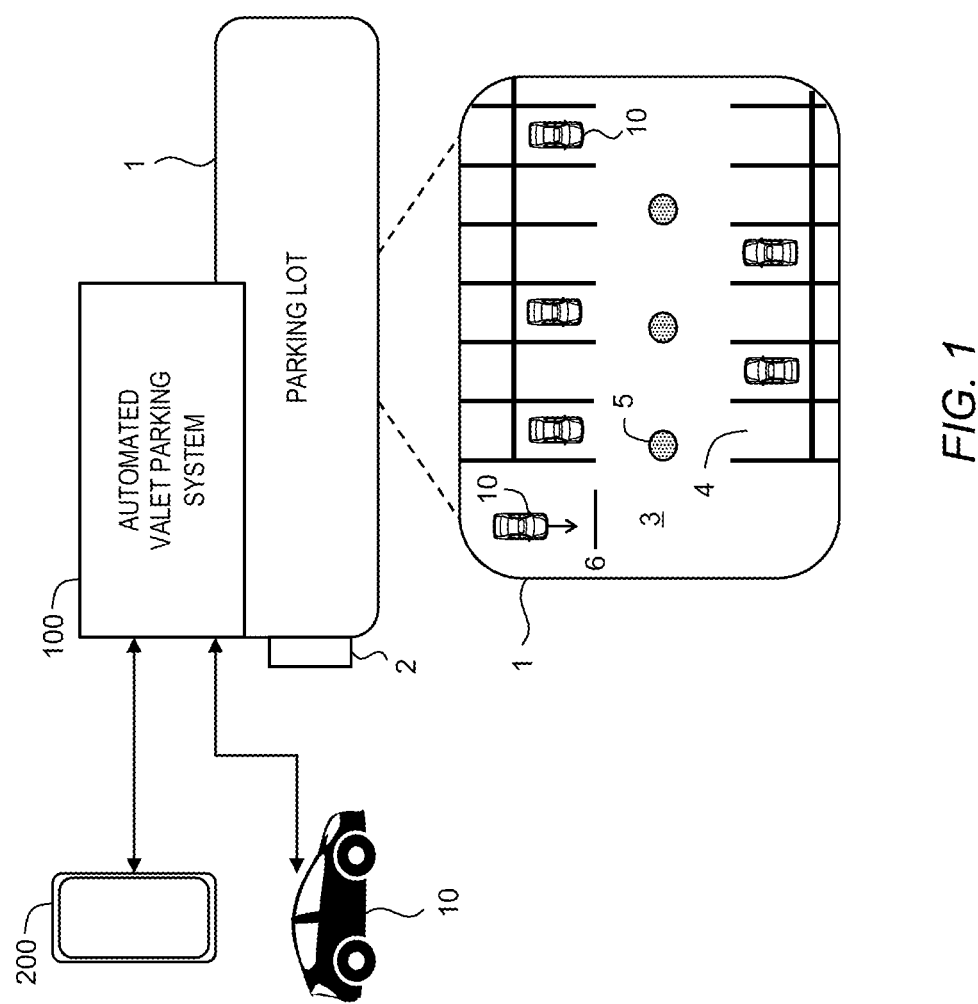
FIG. 1 is a conceptual diagram for explaining an outline of an automated valet parking system according to an embodiment of the present disclosure.

FIG. 1 is a conceptual diagram for explaining an outline of an automated valet parking system 100 according to the present embodiment. The automated valet parking system 100 manages and provides an automated valet parking (AVP) service in a parking lot 1.

A vehicle supporting the automated valet parking service is hereinafter referred to as an "AVP vehicle 10." The AVP vehicle 10 is able to communicate with the automated valet parking system 100. Moreover, the AVP vehicle 10 is able to travel without a driving operation by a driver at least in the parking lot 1. The AVP vehicle 10 may be an automated driving vehicle.

The parking lot 1 is used at least by AVP vehicles 10. The parking lot 1 may be used by general vehicles other than the AVP vehicles 10.

The parking lot 1 includes a pick-up and drop-off area 2, a passage 3, and a plurality of parking spaces 4. The AVP vehicle 10 to enter the parking lot 1 or the AVP vehicle 10 that exits the parking lot 1 is stopped at the pick-up and drop-off area 2. At the pick-up and drop-off area 2, an occupant gets off the AVP vehicle 10 and gets on the AVP vehicle 10. The passage 3 is an area where vehicles such as the AVP vehicles 10 and the general vehicles travel. The parking space 4 is a space in which the vehicle such as the AVP vehicle 10 and the general vehicle is parked. For example, the parking space 4 is partitioned by mark lines.

A mark 5 (landmark) may be placed at a predetermined position in the parking lot 1. The mark 5 is used for guiding the AVP vehicle 10 in the parking lot 1. Examples of the mark 5 include a marker, a pillar, and the like. Typically, a plurality of marks 5 are arranged in a distributed manner in the parking lot 1.

Furthermore, a target stop position (a stop node) requiring the AVP vehicle 10 to stop is set in the parking lot 1. For example, the target stop position is set before an intersection. The target stop position may be indicated by a stop line 6 and the like.

Hereinafter, an example of a flow when a user X uses the automated valet parking service will be described. It is assumed that member information of the user X is registered in advance in the automated valet parking system 100. A vehicle license number (i.e., a number on a license plate) of the AVP vehicle 10 used by the user X may also be registered in advance in the automated valet parking system 100 along with the membership information of the user X.

A terminal device 200 is a terminal device operated by the user X. Typically, the terminal device 200 is owned by the user X. Examples of the terminal device 200 include a smartphone, a tablet, a personal computer, and the like. The terminal device 200 is able to communicate with the automated valet parking system 100.

First, the user X makes a reservation of the automated valet parking. For example, the user X operates the terminal device 200 to input ID information of the user X, a desired parking lot 1, a desired date of use, a desired time of use (i.e., a desired entry time and a desired exit time), and the like. The user X may further input the vehicle license number of the AVP vehicle 10. The terminal device 200 sends reservation information including the input information to the automated valet parking system 100. The automated valet parking system 100 executes reservation processing based on the reservation information, and sends a reservation completion notification to the terminal device 200. In addition, the automated valet parking system 100 sends authentication information associated with the reservation information to the terminal device 200. The terminal device 200 receives the authentication information and holds the received authentication information.

Entry (Check-in) of the AVP vehicle 10 into the parking lot 1 is as follows. The AVP vehicle 10 with the user X arrives and stops at the pick-up and drop-off area 2 of the parking lot 1. At the pick-up and drop-off area 2, the user X (and other occupants if any) gets off the AVP vehicle 10. Then, the user X requests the entry of the AVP vehicle 10 by using the authentication information held in the terminal device 200. For example, the user X sends the authentication information from the terminal device 200 to the automated valet parking system 100. Alternatively, the user X may make a reader installed in the pick-up and drop-off area 2 read the authentication information (e.g., a QR code (registered trademark)).

In response to the entry request, the automated valet parking system 100 conducts authentication of the user X. For example, the automated valet parking system 100 authenticates the user X by checking the authentication information against the reservation information. In addition, the automated valet parking system 100 may read the vehicle license number on the license plate of the AVP vehicle 10 by using a camera installed in the pick-up and drop-off area 2. Then, the automated valet parking system 100 may authenticate the AVP vehicle 10 by checking the read vehicle license number against the vehicle license number that is registered in advance or included in the reservation information.

Upon completion of the authentication, authority to operate the AVP vehicle 10 is transferred from the user X to the automated valet parking system 100. The automated valet parking system 100 executes entry processing with regard to the AVP vehicle 10.

In the entry processing, the automated valet parking system 100 communicates with the AVP vehicle 10 to activate the AVP vehicle 10 (ignition ON).

Further, the automated valet parking system 100 refers to a utilization status of the parking lot 1 to allocate an available parking space 4 to the AVP vehicle 10. Then, the automated valet parking system 100 communicates with the AVP vehicle 10 to provide the AVP vehicle 10 with entry guiding information. The entry guiding information includes information of the allocated parking space 4 and map information of the parking lot 1. The automated valet parking system 100 may specify a travel route from the pick-up and drop-off area 2 to the allocated parking space 4. In that case, the entry guiding information includes information of the specified travel route.

After that, the automated valet parking system 100 communicates with the AVP vehicle 10 to permit the entry.

Upon receipt of the entry permit, the AVP vehicle 10 initiates vehicle travel control. More specifically, based on the entry guiding information, the AVP vehicle 10 automatically travels on the passage 3 from the pick-up and drop-off area 2 to the allocated parking space 4 and automatically parks in the allocated parking space 4. At this time, the AVP vehicle 10 may travel along the travel route specified by the automated valet parking system 100. The automated valet parking system 100 may communicate with the AVP vehicle 10 to remotely control the automated travel of the AVP vehicle 10.

Upon completion of the parking, the AVP vehicle 10 notifies the automated valet parking system 100 of the parking completion. Alternatively, the automated valet parking system 100 may use an infrastructure sensor installed in the parking lot 1 to detect completion of the parking of the AVP vehicle 10. After the parking is completed, the automated valet parking system 100 communicates with the AVP vehicle 10 to deactivate the AVP vehicle 10 (ignition OFF). The automated valet parking system 100 holds the information of the parking space 4 of the AVP vehicle 10 in association with the user X.

Exit (Check-out) of the AVP vehicle 10 from the parking lot 1 is as follows. The user X requests the exit of the AVP vehicle 10 by using the terminal device 200. The exit request includes the authentication information, information of the pick-up and drop-off area 2 specified by the user X, and the like. In response to the exit request, the automated valet parking system 100 conducts authentication of the user X and executes exit processing with regard to the AVP vehicle 10.

In the exit processing, the automated valet parking system 100 communicates with the AVP vehicle 10 to activate the AVP vehicle 10 (ignition ON).

Further, the automated valet parking system 100 communicates with the AVP vehicle 10 to provide the AVP vehicle 10 with exit guiding information. The exit guiding information includes information of the pick-up and drop-off area 2 specified by the user X and the map information of the parking lot 1. The automated valet parking system 100 may specify a travel route from the parking space 4 to the specified pick-up and drop-off area 2. In that case, the exit guiding information includes information of the specified travel route.

After that, the automated valet parking system 100 communicates with the AVP vehicle 10 to permit the exit.

Upon receipt of the exit permit, the AVP vehicle 10 initiates the vehicle travel control. More specifically, the AVP vehicle 10 automatically travels on the passage 3 from the parking space 4 to the specified pick-up and drop-off area 2 based on the exit guiding information. At this time, the AVP vehicle 10 may travel along the travel route specified by the automated valet parking system 100. The automated valet parking system 100 may communicate with the AVP vehicle 10 to remotely control the automated travel of the AVP vehicle 10.

The AVP vehicle 10 arrives and stops at the pick-up and drop-off area 2 specified by the user X. The authority to operate the AVP vehicle 10 is transferred from the automated valet parking system 100 to the user X. The user X (and other occupants if any) gets on the AVP vehicle 10. The AVP vehicle 10 starts moving toward a next destination.

2. AVP Vehicle 2-1. Configuration Example

Figure 2:
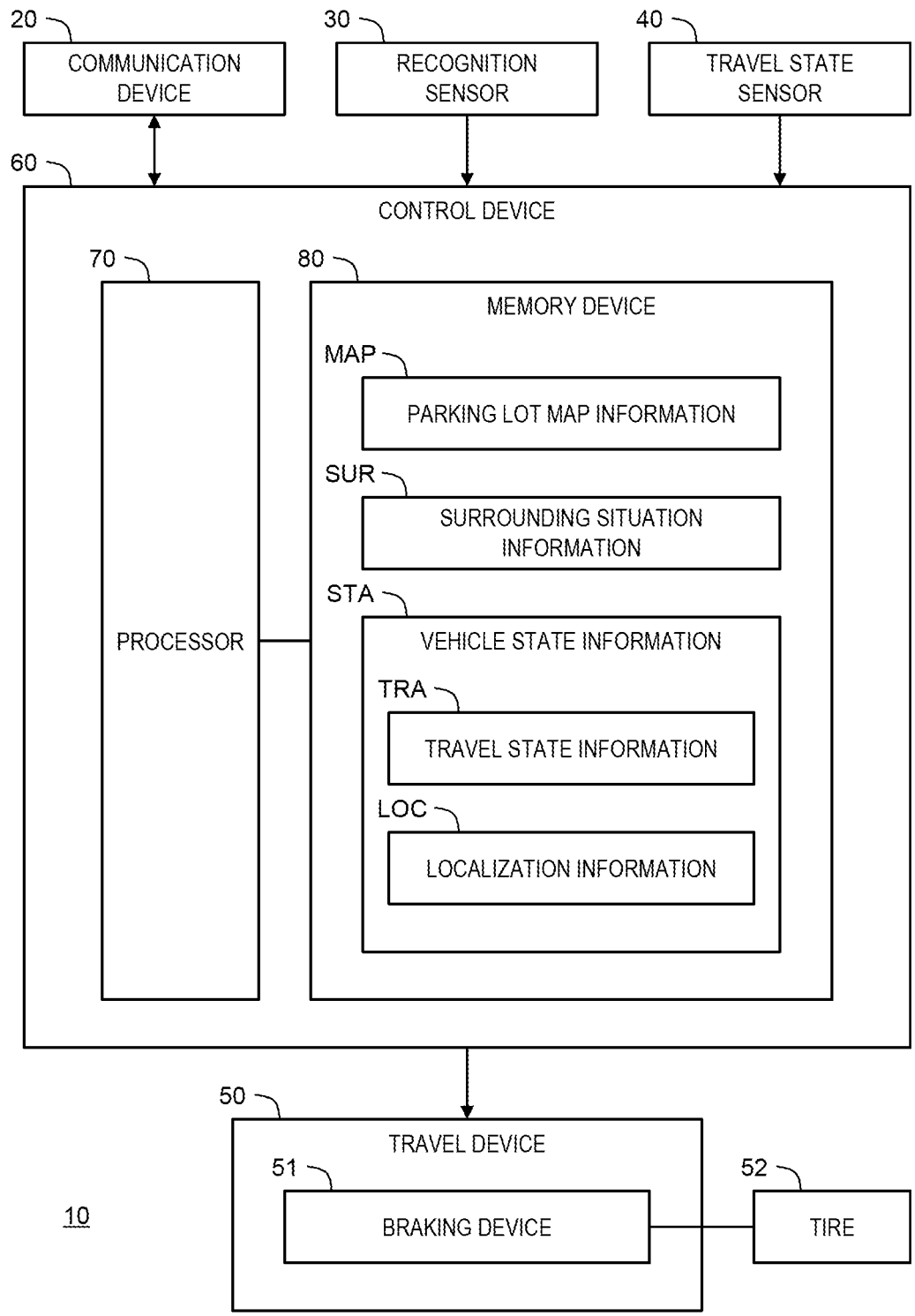
FIG. 2 is a block diagram showing a configuration example of an AVP vehicle according to an embodiment of the present disclosure.

FIG. 2 is a block diagram showing the AVP vehicle 10 according to the present embodiment. The AVP vehicle 10 includes a communication device 20, a recognition sensor 30, a travel state sensor 40, a travel device 50, and a control device (controller) 60.

The communication device 20 performs a wireless communication (e.g., LTE, 5G) with the outside of the AVP vehicle 10. For example, the communication device 20 performs a wireless communication with the automated valet parking system 100.

The recognition sensor 30 recognizes (detects) a situation around the AVP vehicle 10. Examples of the recognition sensor 30 include a camera, a LIDAR (Laser Imaging Detection and Ranging, a radar, a sonar, and the like.

The travel state sensor 40 detects a travel state of the AVP vehicle 10. Examples of the travel state sensor 40 include a vehicle speed sensor, a steering angle sensor, a yaw rate sensor, a lateral acceleration sensor, and the like.

The travel device 50 includes a steering device, a driving device, and a braking device 51. The steering device turns (i.e., changes a direction of) a wheel of the AVP vehicle 10. For example, the steering device includes an electric power steering (EPS) device. The driving device is a power source that generates a driving force. Examples of the driving device include an engine, an electric motor, an in-wheel motor, and the like. The braking device 51 generates a braking force at a tire 52.

The control device (controller) 60 controls the AVP vehicle 10. The control device 60 is also called an electronic control unit (ECU). The control device 60 includes a processor 70 and a memory device 80. The processor 70 executes a variety of processing. The memory device 80 stores a variety of information. Examples of the memory device 80 include a volatile memory, a nonvolatile memory, and the like. The variety of processing by the processor 70 is achieved by the processor 70 executing a control program being a computer program. The control program is stored in the memory device 80 or recorded in a computer-readable recording medium.

2-2. Information Acquisition Processing

The processor 70 executes "information acquisition processing" that acquires a variety of information. The variety of information includes parking lot map information MAP, surrounding situation information SUR, vehicle state information STA, travel state information TRA, localization information LOC, and the like. The acquired information is stored in the memory device 80.

The parking lot map information MAP is map information of the parking lot 1. More specifically, the parking lot map information MAP indicates an arrangement of the pick-up and drop-off area 2, the passage 3, the parking spaces 4, the marks 5, the target stop positions (stop lines 6), and the like in the parking lot 1. The parking lot map information MAP is provided by the automated valet parking system 100. The processor 70 acquires the parking lot map information MAP from the automated valet parking system 100 via the communication device 20.

The surrounding situation information SUR is information indicating a situation around the AVP vehicle 10, and indicates a result of recognition by the recognition sensor 30. For example, the surrounding situation information SUR includes image information captured by the camera. The surrounding situation information SUR may include measurement information indicating a result of measurement by the LIDAR and/or the radar. Furthermore, the surrounding situation information SUR includes object information regarding an object around the AVP vehicle 10. Examples of the object around the AVP vehicle 10 include the passage 3, the parking space 4, the mark 5, the stop line 6, a white line, another vehicle, a structure (e.g., a wall, a pillar), and the like. The object information indicates a relative position and a relative speed of the object with respect to the AVP vehicle 10. Based on at least one of the image information and the measurement information described above, it is possible to recognize the object around the AVP vehicle 10 and to acquire the object information. The processor 70 acquires the surrounding situation information SUR based on the result of recognition by the recognition sensor 30.

The travel state information TRA is information indicating the travel state of the AVP vehicle 10, and indicates a result of detection by the travel state sensor 40. Examples of the travel state of the AVP vehicle 10 include a vehicle speed, a steering angle (a turning angle of a wheel), a yaw rate, a lateral acceleration, and the like. The processor 70 acquires the travel state information TRA from the travel state sensor 40.

Moreover, the processor 70 executes "localization" that estimates a position and an orientation of the AVP vehicle 10 in the parking lot 1. The position and the orientation of the AVP vehicle 10 in the parking lot 1 are hereinafter collectively referred to as a "vehicle position." The processor 70 calculates a movement amount of the AVP vehicle 10 based on the travel state information TRA (specifically, the vehicle speed and the steering angle), thereby roughly calculating the vehicle position. Further, the processor 70 corrects the vehicle position by comparing a predetermined position of the mark 5 indicated by the parking lot map information MAP with the recognized position of the mark 5 indicated by the surrounding situation information SUR. It is thus possible to estimate (identify) the vehicle position with high accuracy. By repeating the calculation of the movement amount and the correction of the vehicle position, it is possible to continuously acquire the highly accurate vehicle position. The localization information LOC indicates the vehicle position estimated by the localization.

The vehicle state information STA indicates the position and the travel state of the AVP vehicle 10. That is, the vehicle state information STA includes the localization information LOC and the travel state information TRA.

2-3. Communication Processing

The processor 70 executes "communication processing" that communicates with the automated valet parking system 100 through the communication device 20. For example, the processor 70 receives the entry guiding information and the exit guiding information described above from the automated valet parking system 100. In addition, the processor 70 periodically transmits the vehicle state information STA described above to the automated valet parking system 100.

2-4. Vehicle Travel Control

The processor 70 executes "vehicle travel control" that controls the travel of the AVP vehicle 10 without depending on a driving operation by the driver. The vehicle travel control includes steering control that steers the AVP vehicle 10, acceleration control that accelerates the AVP vehicle 10, and braking control that decelerates the AVP vehicle 10. The processor 70 executes the vehicle travel control by controlling the travel device 50. More specifically, the processor 70 executes the steering control by controlling the steering device. The processor 70 executes the acceleration control by controlling the driving device. The processor 70 executes the braking control by controlling the braking device 51.

In the parking lot 1, the processor 70 executes the vehicle travel control in order to make the AVP vehicle 10 autonomously travel. More specifically, the processor 70 grasps the map of the parking lot 1 and the vehicle position in the parking lot 1 based on the parking lot map information MAP and the localization information LOC. Then, the processor 70 executes the vehicle travel control so that the AVP vehicle 10 automatically travels to a destination.

For example, in the case of the above-described entry processing, the point of departure is the pick-up and drop-off area 2 and the destination is the allocated parking space 4. The processor 70 executes the vehicle travel control such that the AVP vehicle 10 automatically travels from the pick-up and drop-off area 2 to the allocated parking space 4 and automatically parks in the allocated parking space 4. The position of the allocated parking space 4 is obtained from the parking lot map information MAP. The processor 70 may execute the vehicle travel control such that the AVP vehicle 10 travels along the travel route specified by the automated valet parking system 100. When the AVP vehicle 10 parks in the parking space 4, it is also possible to grasp the parking space 4 and a surrounding parking situation by referring to the surrounding situation information SUR. The vehicle travel control may be executed so as to avoid a collision with another vehicle or a structure by referring to the surrounding situation information SUR.

The same applies to the exit processing. In the case of the exit processing, the point of departure is the allocated parking space 4 and the destination is the pick-up and drop-off area 2. The processor 70 executes the vehicle travel control so that the AVP vehicle 10 automatically travels from the parking space 4 to the pick-up and drop-off area 2 and automatically stops in the pick-up and drop-off area 2.

3. Braking Control of AVP Vehicle in Parking Lot

Figure 3:
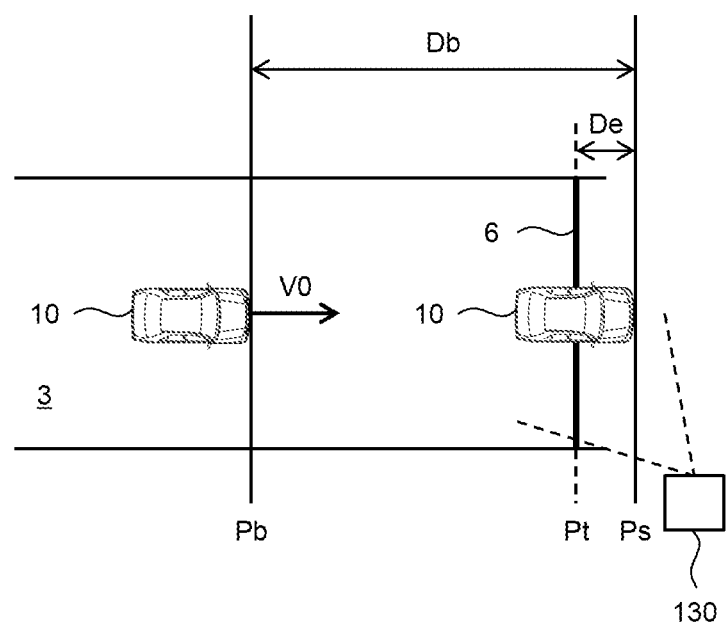
FIG. 3 is a conceptual diagram for explaining an example of braking control of the AVP vehicle according to an embodiment of the present disclosure.

FIG. 3 is a conceptual diagram for explaining an example of the braking control of the AVP vehicle 10 according to the present embodiment. A target stop position Pt (a stop node) requiring the AVP vehicle 10 to stop is set in the parking lot 1. For example, the target stop position Pt is set before an intersection. The target stop position Pt is indicated by a stop line 6 and the like.

The AVP vehicle 10 (i.e., the processor 70) executes the braking control so as to automatically decelerate and stop before the target stop position Pt. More specifically, the AVP vehicle 10 travels at a predetermined speed V0 in the passage 3 in the parking lot 1. At a braking start position Pb before the target stop position Pt, the AVP vehicle 10 (i.e., the processor 70) starts the braking control to generate the braking force. A target deceleration in the braking control may be predetermined. As a result of the braking control, the AVP vehicle 10 decelerates from the predetermined speed V0 and eventually stops. An actual stop position Ps is a position at which the AVP vehicle 10 is actually stopped. A braking distance Db is a travel distance until the AVP vehicle 10 is stopped by the braking control, that is, a distance from the braking start position Pb to the actual stop position Ps. An error distance De is a distance between the target stop position Pt and the actual stop position Ps.

Here, a case where an abnormality (malfunction) occurs in the braking device 51 or the tire 52 of the AVP vehicle 10 is considered. Examples of the abnormality of the braking device 51 include an actuator failure, an extreme wear of a brake pad, and the like. Examples of the abnormality of the tire 52 include a blowout, an extreme wear, and the like. Such the abnormality of the braking device 51 or the tire 52 leads to decrease in braking performance of the AVP vehicle 10, which in turn leads to decrease in accuracy of the above-described vehicle travel control. It is therefore desirable to detect the abnormality of the braking device 51 or the tire 52 of the AVP vehicle 10.

4. Information Providing Service

4-1. Overview

The automated valet parking system 100 according to the present embodiment detects an abnormality of the AVP vehicle 10 (particularly, the braking device 51, the tire 52) and notifies the user X of the AVP vehicle 10 of the occurrence of the abnormality. Such the service of detecting the abnormality of the AVP vehicle 10 and notifying the user X of the occurrence of the abnormality is hereinafter referred to as an "information providing service." The information providing service is a part of the automated valet parking service.

Figure 4:
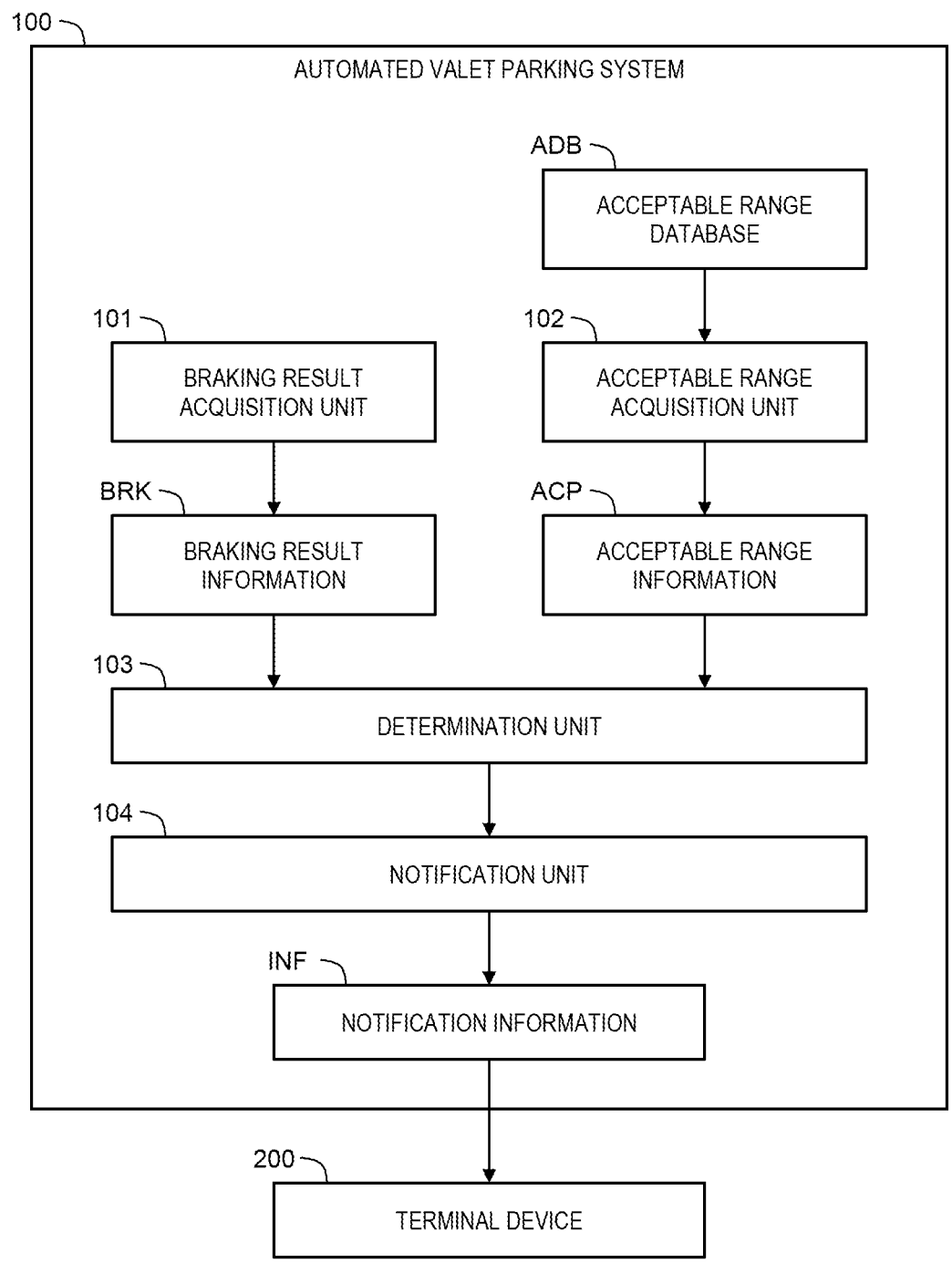
FIG. 4 is a block diagram showing processing related to the information providing service by the automated valet parking system according to an embodiment of the present disclosure.

FIG. 4 is a block diagram showing processing related to the information providing service by the automated valet parking system 100 according to the present embodiment. The automated valet parking system 100 includes a braking result acquisition unit 101, an acceptable range acquisition unit 102, a determination unit 103, and a notification unit 104 as functional blocks.

Figure 5:
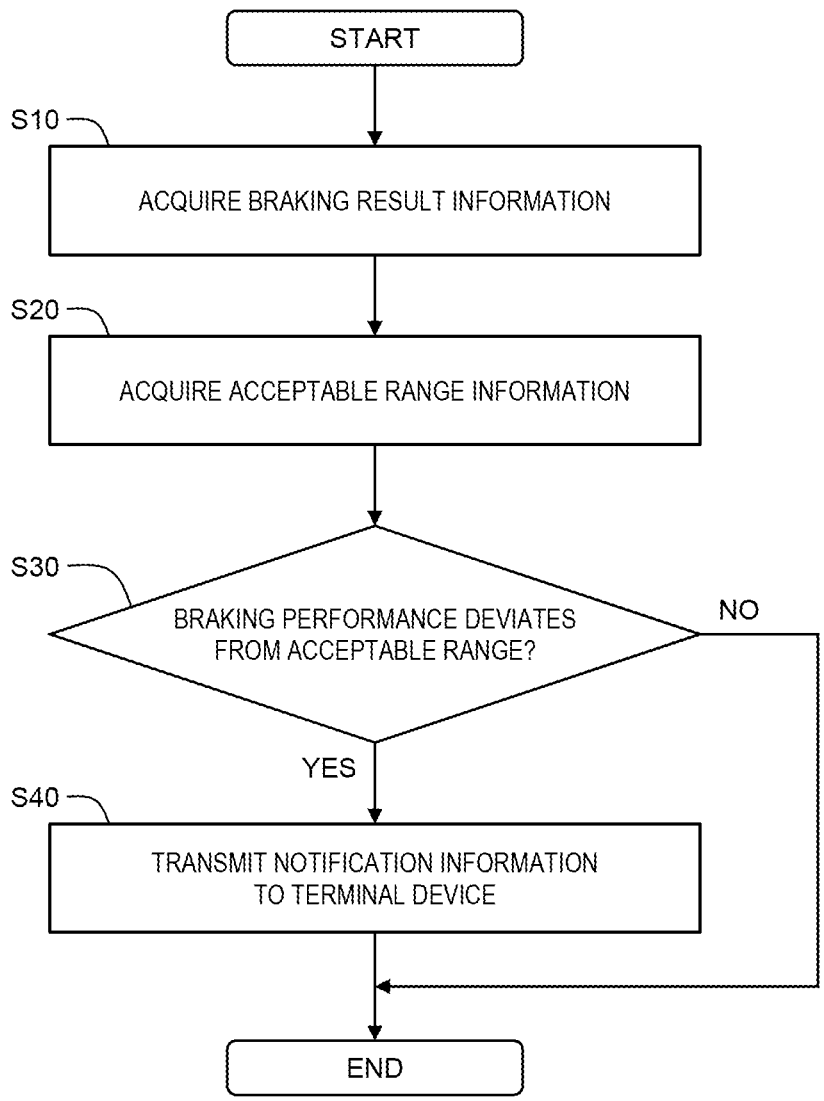
FIG. 5 is a flow chart showing processing related to the information providing service by the automated valet parking system according to an embodiment of the present disclosure.

FIG. 5 is a flow chart showing processing related to the information providing service by the automated valet parking system 100 according to the present embodiment. Hereinafter, an outline of the processing related to the information providing service according to the present embodiment will be described with reference to FIGS. 4 and 5.

In Step S10, the braking result acquisition unit 101 acquires braking result information BRK. The braking result information BRK indicates a result of the braking control of the AVP vehicle 10 as shown in FIG. 3. More specifically, the braking result information BRK indicates the braking distance Db or the error distance De which is the result of the braking control. The braking distance Db and the error distance De each reflects the braking performance of the AVP vehicle 10. Various examples of Step S10 will be described later.

In Step S20, the acceptable range acquisition unit 102 acquires acceptable range information ACP. The acceptable range information ACP indicates an acceptable range of the braking performance of the AVP vehicle 10. That is, the acceptable range information ACP indicates an acceptable range of the braking distance Db or the error distance De. Acceptable range database ADB is a database that stores information necessary for acquiring the acceptable range information ACP. Various examples of Step S20 will be described later.

In Step S30, the determination unit 103 determines whether or not the braking performance of the AVP vehicle 10 deviates from the acceptable range. More specifically, the determination unit 103 determines whether or not the braking distance Db or the error distance De indicated by the braking result information BRK deviates from the acceptable range indicated by the acceptable range information ACP. When the braking performance (the braking distance Db or the error distance De) is included in the acceptable range (Step S30; No), the processing ends. On the other hand, when the braking performance (the braking distance Db or the error distance De) deviates from the acceptable range (Step S30; Yes), the determination unit 103 decides that an abnormality occurs in the braking device 51 or the tire 52 of the AVP vehicle 10. In this case, the processing proceeds to Step S40.

In Step S40, the notification unit 104 transmits notification information INF to the terminal device 200. The notification information INF is information notifying at least the occurrence of the abnormality in the braking device 51 or the tire 52. The terminal device 200 provides the received notification information INF to the user X of the AVP vehicle 10. Typically, the terminal device 200 displays the received notification information INF on a display device. The user X of the AVP vehicle 10 is able to know the occurrence of the abnormality in the braking device 51 or the tire 52 of the AVP vehicle 10 through the notification information INF.

4-2. Examples of Step S10

Next, various examples of Step S10 will be described.

4-2-1. First Example

Figure 6:
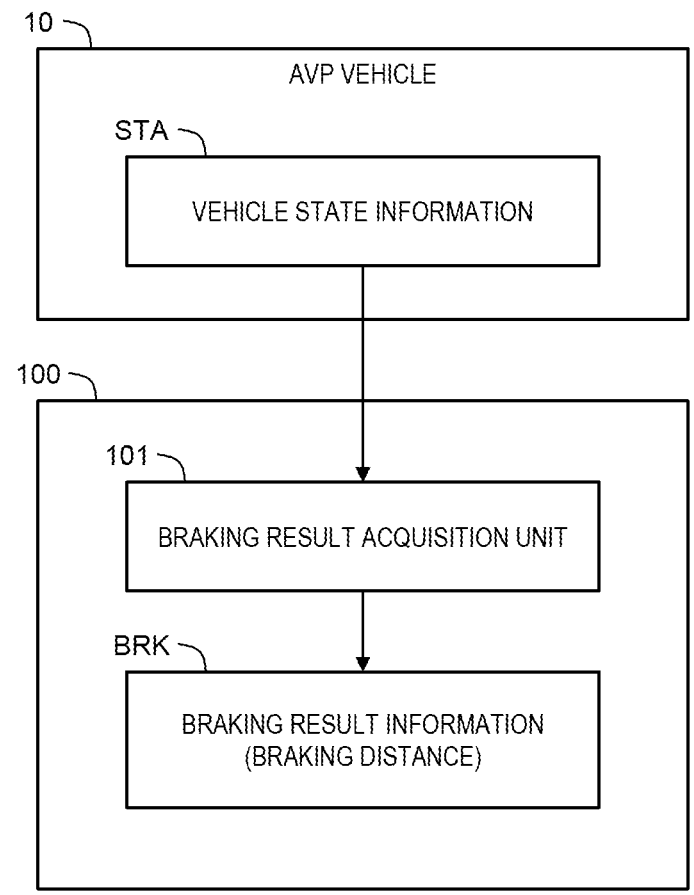
FIG. 6 is a block diagram for explaining a first example of Step S10 in FIG. 5.

FIG. 6 is a block diagram for explaining a first example of Step S10. In the first example, the braking result information BRK indicates the braking distance Db.

The AVP vehicle 10 periodically transmits the vehicle state information STA (i.e., the localization information LOC and the travel state information TRA) to the automated valet parking system 100. The braking result acquisition unit 101 receives the vehicle state information STA from the AVP vehicle 10. The braking result acquisition unit 101 recognizes a braking start timing and a stop timing based on the travel state information TRA. Further, based on the localization information LOC, the braking result acquisition unit 101 recognizes the braking start position Pb being the vehicle position at the braking start timing and the actual stop position Ps being the vehicle position at the stop timing. Then, the braking result acquisition unit 101 calculates a distance from the braking start position Pb to the actual stop position Ps as the braking distance Db. It should be noted that a distance on a curve section can be calculated by calculating a movement distance based on a difference between positions at every predetermined sampling period and integrating movement distances. In this manner, the braking result acquisition unit 101 calculates the braking distance Db based on the vehicle state information STA to acquire the braking result information BRK.

As a modification example, the processor 70 of the AVP vehicle 10 may calculate the braking distance Db based on the vehicle state information STA. In this case, the braking result information BRK is included in the vehicle state information STA transmitted from the AVP vehicle 10 to the automated valet parking system 100. That is, the braking result acquisition unit 101 acquires the braking result information BRK from the AVP vehicle 10.

4-2-2. Second Example

Figure 7:
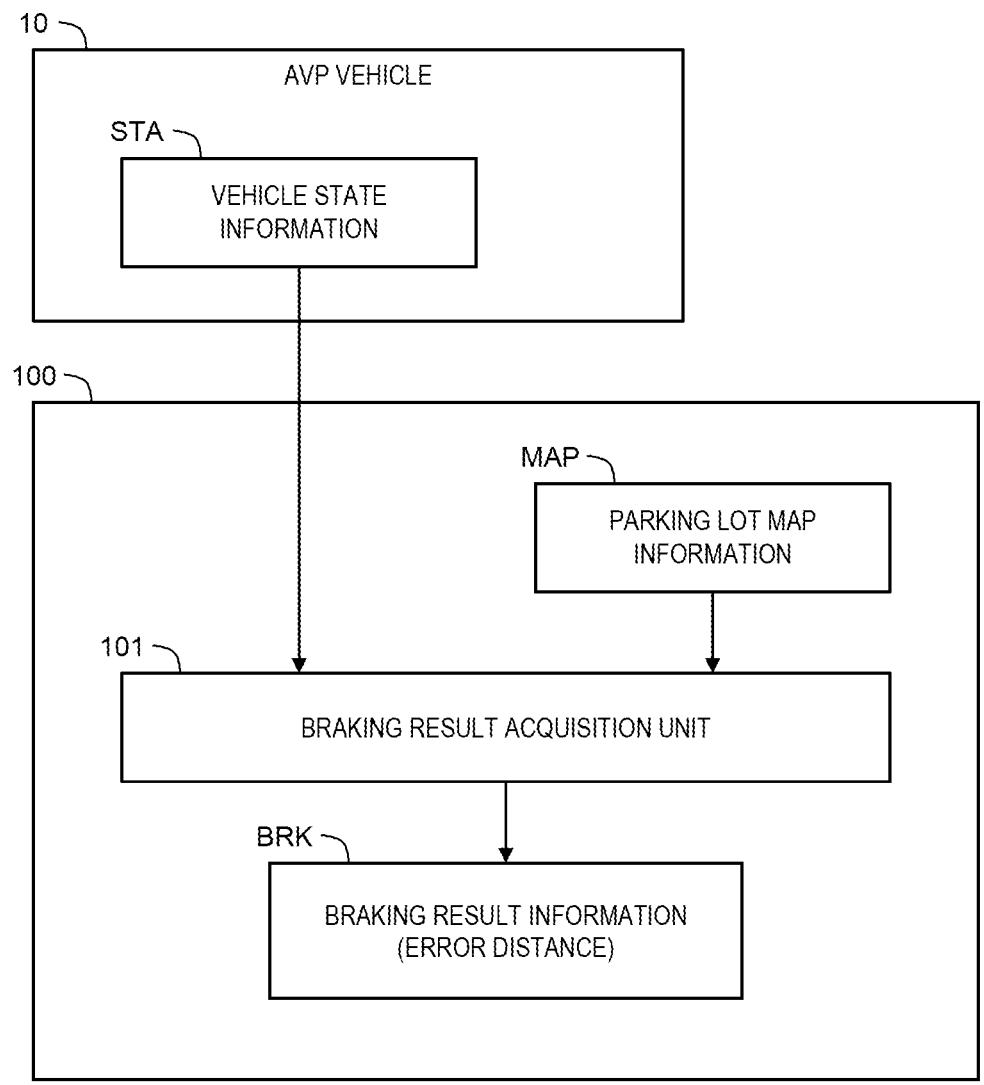
FIG. 7 is a block diagram for explaining a second example of Step S10 in FIG. 5.

FIG. 7 is a block diagram for explaining a second example of Step S10. In the second example, the braking result information BRK indicates the error distance De between the target stop position Pt and the actual stop position Ps.

As in the case of the first example, the braking result acquisition unit 101 acquires the vehicle state information STA from the AVP vehicle 10. Based on the vehicle state information STA, the braking result acquisition unit 101 recognizes the actual stop position Ps being the vehicle position at the stop timing. Meanwhile, the parking lot map information MAP indicates the target stop position Pt in the parking lot 1. The braking result acquisition unit 101 calculates the error distance De based on the target stop position Pt indicated by the parking lot map information MAP and the actual stop position Ps to acquire the braking result information BRK.

4-2-3. Third Example

Figure 8:
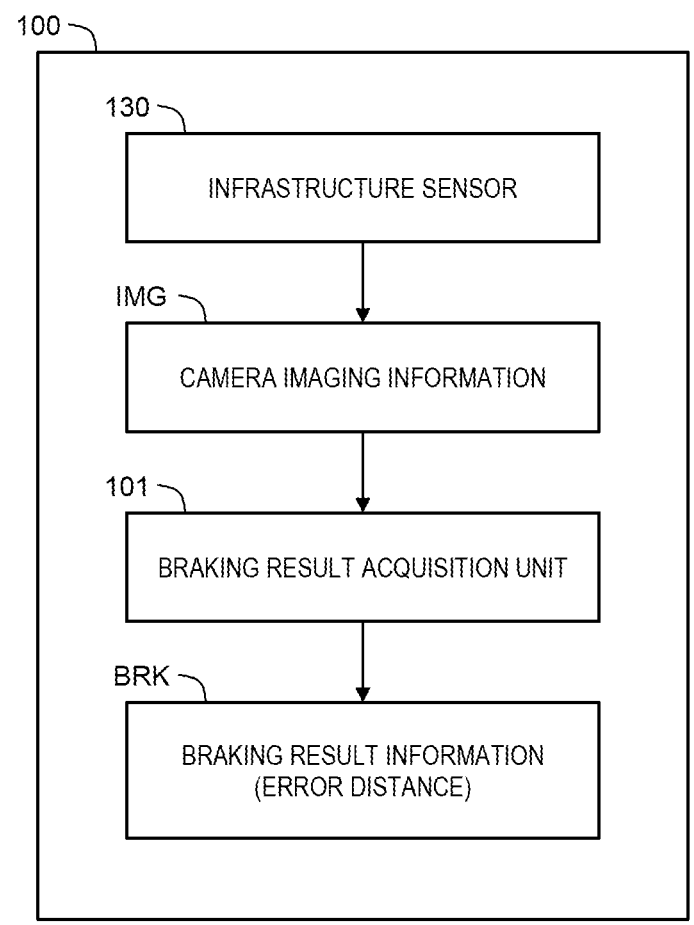
FIG. 8 is a block diagram for explaining a third example of Step S10 in FIG. 5.

FIG. 8 is a block diagram for explaining a third example of Step S10. Also in the third example, the braking result information BRK indicates the error distance De between the target stop position Pt and the actual stop position Ps.

The automated valet parking system 100 includes an infrastructure sensor 130 installed in the parking lot 1. The infrastructure sensor 130 includes a camera that images the target stop position Pt and its surroundings (see FIG. 3). Camera imaging information IMG includes an image imaged (captured) by the camera. That is, the camera imaging information IMG includes an image of the target stop position Pt and its surroundings.

The braking result acquisition unit 101 acquires the camera imaging information IMG from the infrastructure sensor 130. The braking result acquisition unit 101 identifies the AVP vehicle 10 and the target stop position Pt (e.g., the stop line 6) by analyzing the image indicated by the camera imaging information IMG. Examples of the image analyzing method include semantic segmentation and edge detection. Furthermore, the braking result acquisition unit 101 analyzes the image to detect stopping of the AVP vehicle 10 and identify a position at which the AVP vehicle 10 is stopped as the actual stop position Ps. Then, the braking result acquisition unit 101 calculates a distance between the actual stop position Ps and the target stop position Pt (e.g., the stop line 6) as the error distance De to acquire the braking result information BRK.

It should be noted that the AVP vehicle 10 of the user X is distinguished from other vehicles based on, for example, the vehicle license number. For example, the camera recognizes the vehicle license number of each vehicle. By referring to the vehicle license number of the AVP vehicle 10 of the user X that is registered in advance, it is possible to distinguish the AVP vehicle 10 of the user X from other vehicles.

4-3. Examples of Step S20

Next, various examples of Step S20 will be described.

4-3-1. First Example

In a first example, the braking result information BRK indicates the braking distance Db. The acceptable range information ACP indicates a first acceptable range RA1 being the acceptable range of the braking distance Db. In this case, "the braking performance of the AVP vehicle 10 deviating from the acceptable range" means "the braking distance Db deviating from the first acceptable range RA1."

Figure 9:
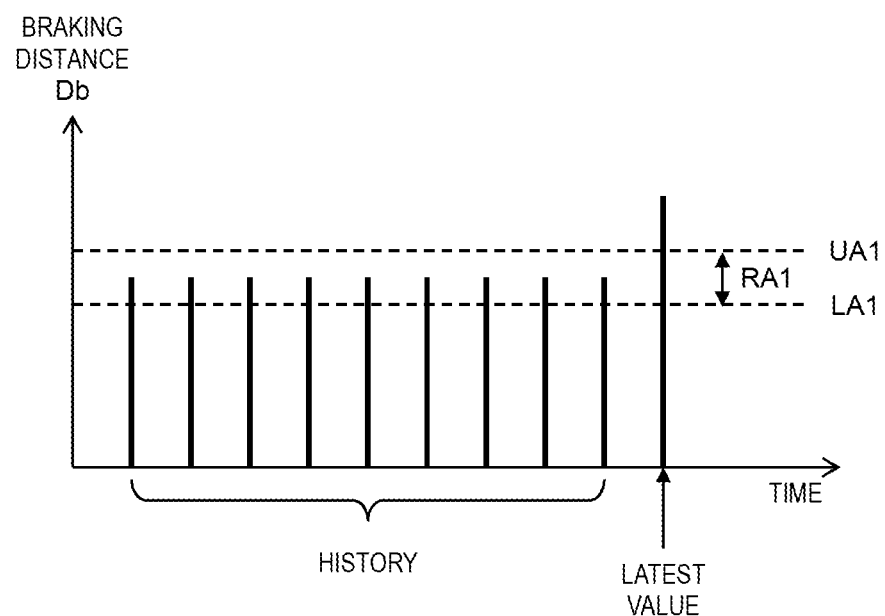
FIG. 9 is a conceptual diagram for explaining a first example of Step S20 in FIG. 5.

FIG. 9 is a conceptual diagram for explaining a first example of Step S20. In FIG. 9, a history of the braking distance Db regarding the AVP vehicle 10 is shown. A vertical axis represents the braking distance Db, and a horizontal axis represents the time.

The first acceptable range RA1 of the braking distance Db is set based on the history of the braking distance Db regarding the AVP vehicle 10. More specifically, the first acceptable range RA1 is set to a certain range including an average value of the braking distances Db in a certain period of time in the past or of a certain number of times in the past. In this case, an upper limit UA1 and a lower limit LA1 of the first acceptable range RA1 are represented by "average value+α1" and "average value −β1", respectively. The parameters α1 and β1 may be the same value or may be different values. Since it is considered that there is no problem when the braking distance Db is short, the lower limit LA1 may be set to zero. It should be noted that in the example shown in FIG. 9, the latest value of the braking distance Db deviates from the first acceptable range RA1.

The history of the braking result information BRK (i.e., the braking distance Db) regarding the AVP vehicle 10 is registered in the acceptable range database ADB. More specifically, every time the AVP vehicle 10 executes the braking control before the target stop position Pt in the parking lot 1, the braking result information BRK obtained in the above-described Step S10 is registered in the acceptable range database ADB. At this time, the braking result information BRK regarding the AVP vehicle 10 is associated with the membership information of the user X and/or the vehicle license number of the AVP vehicle 10.

In Step S20, the acceptable range acquisition unit 102 refers to the membership information of the user X or the vehicle license number of the AVP vehicle 10 to acquire the history of the braking result information BRK regarding the subject AVP vehicle 10 from the acceptable range database ADB. Then, based on the history of the braking result information BRK (the braking distance Db), the acceptable range acquisition unit 102 sets the first acceptable range RA1 to acquire the acceptable range information ACP.

4-3-2. Second Example

In a second example, the braking result information BRK indicates the error distance De between the target stop position Pt and the actual stop position Ps. The acceptable range information ACP indicates a second acceptable range RA2 being the acceptable range of the error distance De. In this case, "the braking performance of the AVP vehicle 10 deviating from the acceptable range" means "the error distance De deviating from the second acceptable range RA2."

Figure 10:
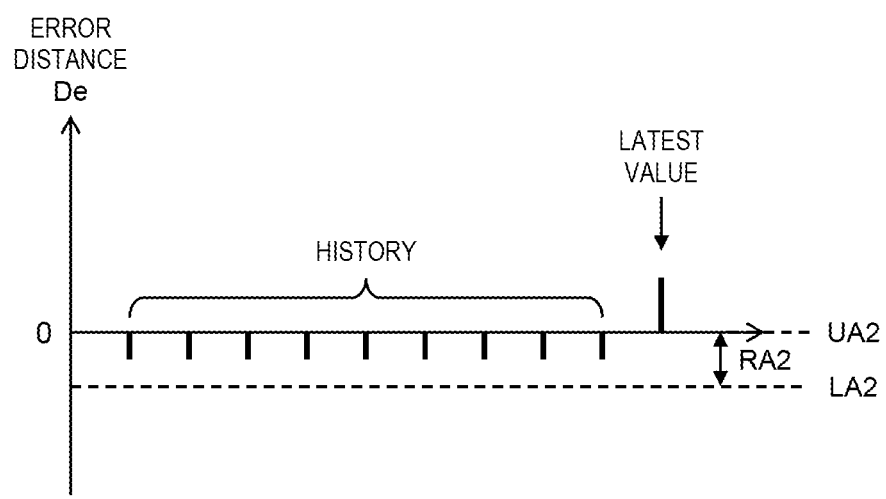
FIG. 10 is a conceptual diagram for explaining a second example of Step S20 in FIG. 5.

FIG. 10 is a conceptual diagram for explaining a second example of Step S20. In FIG. 10, a history of the error distance De regarding the AVP vehicle 10 is shown. A vertical axis represents the error distance De, and a horizontal axis represents the time. A negative error distance De means that the AVP vehicle 10 has stopped before (short of) the target stop position Pt. On the other hand, a positive error distance De means that the AVP vehicle 10 has gone beyond (overrun) the target stop position Pt.

The second acceptable range RA2 of the error distance De is set based on the history of the error distance De regarding the AVP vehicle 10. More specifically, the second acceptable range RA2 is set to a certain range including an average value of the error distances De in a certain period of time in the past or of a certain number of times in the past. In this case, an upper limit UA2 and a lower limit LA2 of the second acceptable range RA2 are represented by "average value+α2" and "average value −β2", respectively. The parameters α2 and β2 may be the same value or may be different values. Any one of the upper limit UA2 and the lower limit LA2 may be set to zero. It should be noted that in the example shown in FIG. 10, the latest value of the error distance De deviates from the second acceptable range RA2.

As in the case of the first example, the history of the braking result information BRK (i.e., the error distance De) regarding the AVP vehicle 10 is registered in the acceptable range database ADB. In Step S20, the acceptable range acquisition unit 102 acquires the history of the braking result information BRK regarding the subject AVP vehicle 10 from the acceptable range database ADB. Then, based on the history of the braking result information BRK (the error distance De), the acceptable range acquisition unit 102 sets the second acceptable range RA2 to acquire the acceptable range information ACP.

4-3-3. Third Example

In the first and second examples described above, "the history of the braking result information BRK regarding the AVP vehicle 10" may be replaced with "the history of the braking result information BRK regarding another vehicle of the same vehicle type as the AVP vehicle 10." In this case, the history of the braking result information BRK regarding another vehicle of the same vehicle type as the AVP vehicle 10 is registered in the acceptable range database ADB. In Step S20, the acceptable range acquisition unit 102 acquires the history of the braking result information BRK regarding another vehicle of the same vehicle type as the subject AVP vehicle 10 from the acceptable range database ADB. Then, based on the history of the braking result information BRK, the acceptable range acquisition unit 102 sets the first acceptable range RA1 or the second acceptable range RA2 to acquire the acceptable range information ACP.

4-3-4. Fourth Example

The acceptable range may be a certain range that is predetermined.

For example, the first acceptable range RA1 being the acceptable range of the braking distance Db may be set to a certain range including a target braking distance. In the passage 3 in the parking lot 1, the AVP vehicle 10 travels at a predetermined speed VO. A target deceleration in the braking control is predetermined. The target braking distance is obtained from the predetermined speed VO and the target deceleration. Information on the first acceptable range RA1 is registered in the acceptable range database ADB. The acceptable range acquisition unit 102 acquires the information on the first acceptable range RA1, that is, the acceptable range information ACP from the acceptable range database ADB.

As another example, the second acceptable range RA2 being the acceptable range of the error distance De may be set to a certain range including zero. Information on the second acceptable range RA2 is registered in the acceptable range database ADB. The acceptable range acquisition unit 102 acquires the information on the second acceptable range RA2, that is, the acceptable range information ACP from the acceptable range database ADB.

4-4. Effects

According to the present embodiment, as described above, it is possible to detect an abnormality of the braking device 51 or the tire 52 of the AVP vehicle 10 supporting the automated valet parking service. More specifically, the AVP vehicle 10 executes the braking control so as to automatically decelerate and stop before the target stop position Pt that is set in the parking lot 1. The braking distance Db or the error distance De, which is the result of the braking control, reflects the braking performance of the AVP vehicle 10. It is therefore possible to determine whether or not an abnormality occurs in the braking performance of the AVP vehicle 10, that is, whether or not an abnormality occurs in the braking device 51 or the tire 52 based on the braking distance Db or the error distance De. More specifically, when the braking distance Db or the error distance De deviates from the acceptable range, it is decided that an abnormality occurs in the braking device 51 or the tire 52. In this manner, it is possible to detect the abnormality of the braking device 51 or the tire 52 of the AVP vehicle 10.

The automated valet parking system 100 transmits the notification information INF for notifying the occurrence of the abnormality in the braking device 51 or the tire 52 of the AVP vehicle 10 to the terminal device 200. The user X of the AVP vehicle 10 is able to know the occurrence of the abnormality in the braking device 51 or the tire 52 of the AVP vehicle 10 through the notification information INF. Such the information providing service is performed as a part of the automated valet parking service and contributes to increase in convenience and usefulness of the automated valet parking service.

The user X who receives the notification information INF can consider inspection or repair of the braking device 51, or a change of tire 52. When the abnormality of the braking device 51 or the tire 52 is resolved, the deceleration performance of the AVP vehicle 10 makes a recovery. As a result, the accuracy of the vehicle travel control also makes a recovery. This is suitable for the automated valet parking service that requires precise vehicle travel control.

It should be noted that it is common that the AVP vehicle 10 existing in the parking lot 1 transmits the vehicle state information STA to the automated valet parking system 100. It is also common that the infrastructure sensor 130 is installed in the parking lot 1. It can be said that the information providing service according to the present embodiment is realized by effectively utilizing existing information and equipment. This is advantageous in terms of costs.

5. Additional Service

It is also conceivable to provide an "additional service" other than the parking service to the AVP vehicle 10 by effectively utilizing a period in which the AVP vehicle 10 is left in the parking lot 1 (that is, a period in which no occupant is on the AVP vehicle 10). Examples of the additional service include car wash, inspection, repair, refueling, charging, tire change, and the like of the AVP vehicle 10. Such additional service also is a part of the automated valet parking service.

Figure 11:
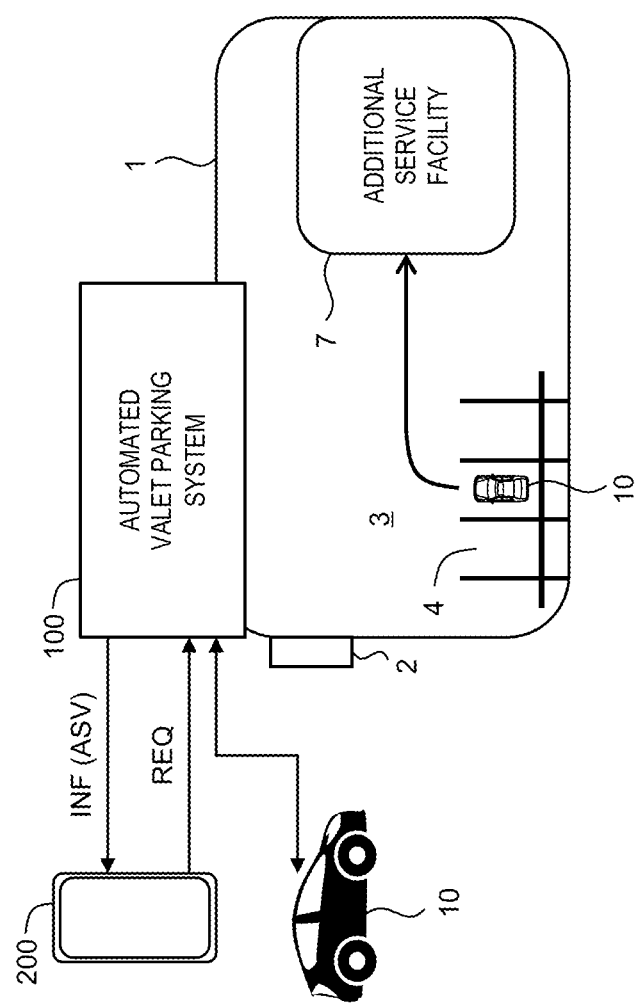
FIG. 11 is a conceptual diagram for explaining an additional service according to an embodiment of the present disclosure.

FIG. 11 is a conceptual diagram for explaining the additional service according to the present embodiment. An additional service facility 7 is a facility for performing the additional service with respect to the AVP vehicle 10. The additional service facility 7 is located within the parking lot 1 or is affiliated with the parking lot 1.

As described above, the automated valet parking system 100 transmits the notification information INF to the terminal device 200. The notification information INF may include "additional service information ASV" that proposes to perform the additional service during a period in which the AVP vehicle 10 is left in the parking lot 1. The additional service here includes at least one of inspection and repair of the AVP vehicle 10 (the braking device 51) and tire change. In other words, the additional service information ASV proposes to perform the additional service including at least one of inspection, repair, and tire change.

The user X of the AVP vehicle 10 knows the presence of the additional service through the additional service information ASV. Therefore, the user X can consider using the additional service in order to resolve the abnormality of the braking device 51 or the tire 52. The additional service information ASV may indicate at least one of a time of day in which the additional service is available, a waiting time for the additional service to be available, and an expected time required for performing the additional service. These pieces of information are useful for the user X to consider whether or not to use the additional service.

When determining to use the additional service, the user X operates the terminal device 200 to send an additional service request REQ to the automated valet parking system 100. The additional service request REQ is information for requesting use of the additional service.

Figure 12:
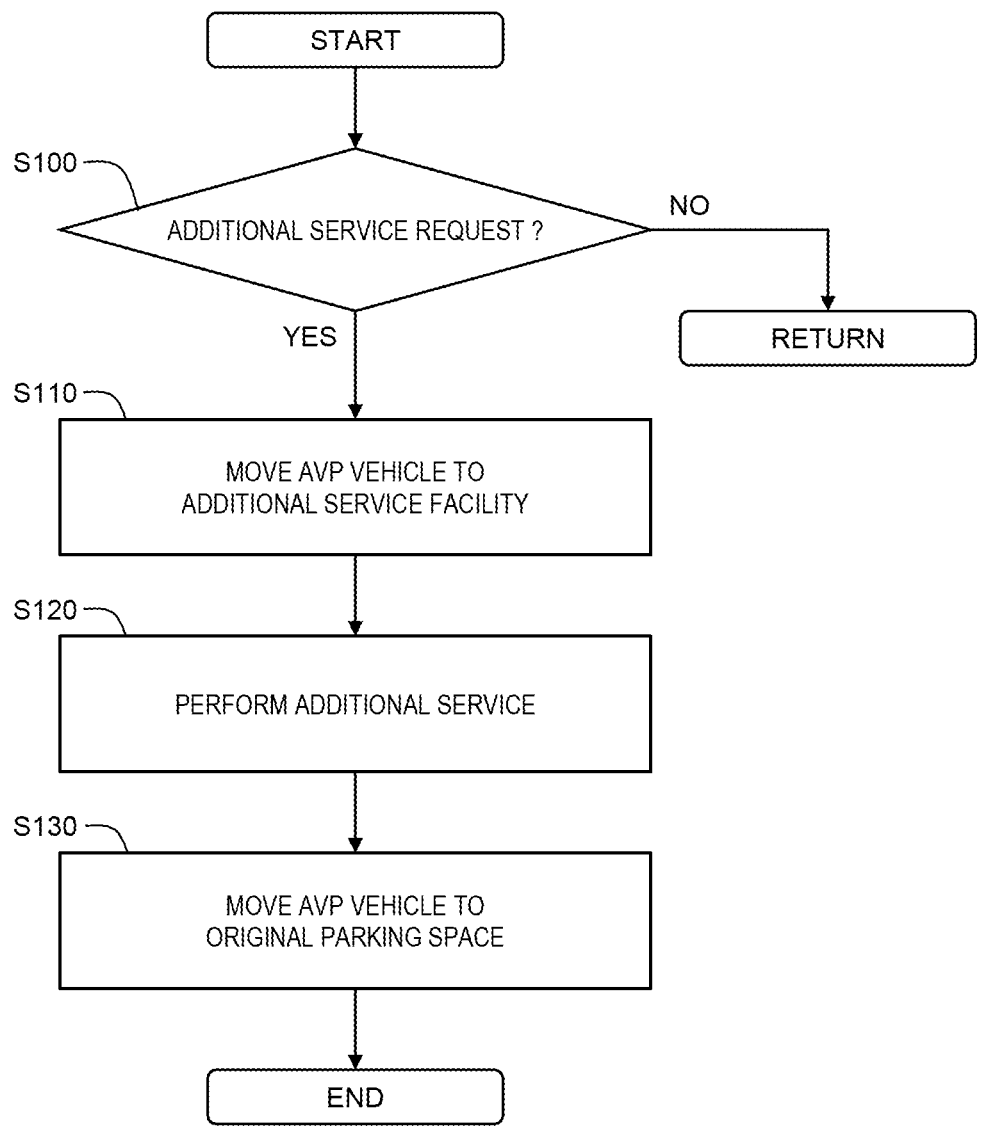
FIG. 12 is a flow chart showing processing related to the additional service according to an embodiment of the present disclosure.

FIG. 12 is a flow chart showing processing related to the additional service according to the present embodiment.

In Step S100, the automated valet parking system 100 determines whether or not it receives the additional service request REQ from the terminal device 200. When the automated valet parking system 100 receives the additional service request REQ (Step S100; Yes), the processing proceeds to Step S110.

In Step S110, the automated valet parking system 100 performs move processing that moves the AVP vehicle 10 to the additional service facility 7 (see FIG. 11). The move processing is performed in the same manner as the entry processing and the exit processing. The point of departure is the parking space 4 in which the AVP vehicle 10 is parked, and the destination is the additional service facility 7. The automated valet parking system 100 specifies the destination and instructs the AVP vehicle 10 to move to the destination. The AVP vehicle 10 (i.e., the processor 70) executes the vehicle travel control such that the AVP vehicle 10 automatically travels from the parking space 4 to the additional service facility 7. After that, the processing proceeds to Step S120.

In Step S120, the automated valet parking system 100 instructs an operator to perform the additional service. The operator performs the additional service with respect to the AVP vehicle 10. When the additional service is completed, the operator notifies the automated valet parking system 100 of the service completion. After that, the processing proceeds to Step S130.

In Step S130, the automated valet parking system 100 performs move processing that moves the AVP vehicle 10 to the original parking space 4. The move processing is performed in the same manner as the entry processing and the exit processing. The point of departure is the additional service facility 7, and the destination is the original parking space 4. The automated valet parking system 100 specifies the destination and instructs the AVP vehicle 10 to move to the destination. The AVP vehicle 10 (i.e., the processor 70) executes the vehicle travel control such that the AVP vehicle 10 automatically travels from the additional service facility 7 to the parking space 4 and automatically parks in the parking space 4. The automated valet parking system 100 may transmit information indicating the completion of the additional service to the terminal device 200.

As described above, when the automated valet parking service includes the additional service, the automated valet parking system 100 can transmit the notification information INF including the additional service information ASV to the terminal device 200. In other words, the automated valet parking system 100 is able to actively suggest the use of the additional service to the user X. As a result, increase in opportunity of usage of the additional service is expected. This is preferable for a service provider. Moreover, when the additional service is used, the convenience and the usefulness of the automated valet parking service are further increased.

6. Concrete Example of Automated Valet Parking System

6-1. Configuration Example

Figure 13:
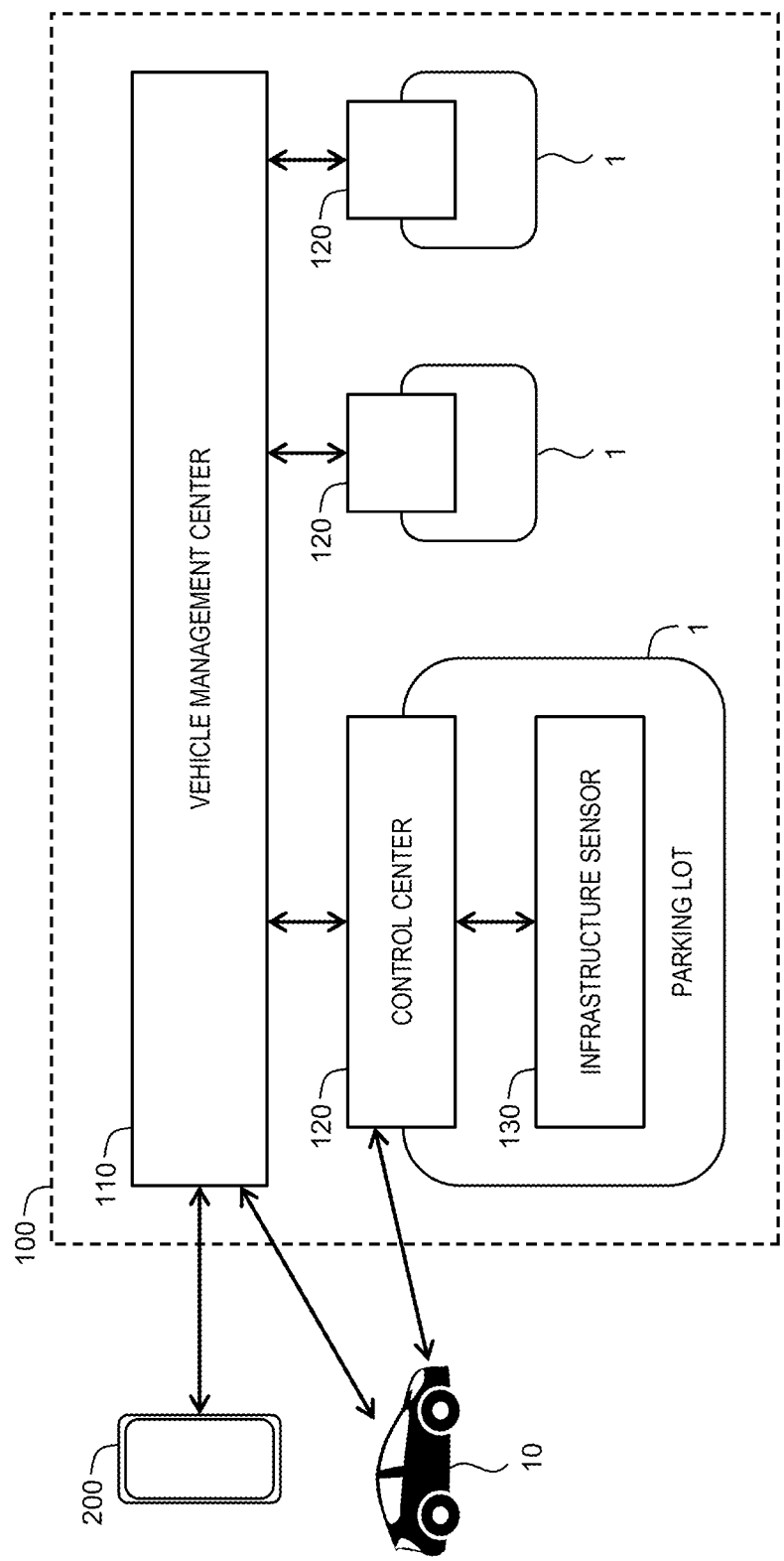
FIG. 13 is a schematic diagram showing a configuration example of the automated valet parking system according to an embodiment of the present disclosure.

FIG. 13 is a schematic diagram showing a configuration example of the automated valet parking system 100 according to the present embodiment. The automated valet parking system 100 includes a vehicle management center 110, a control center 120, and the infrastructure sensor 130. The control center 120 is placed for each parking lot 1. Therefore, there are as many control centers 120 as the parking lots 1. The vehicle management center 110 controls all the control centers 120.

Figure 14:
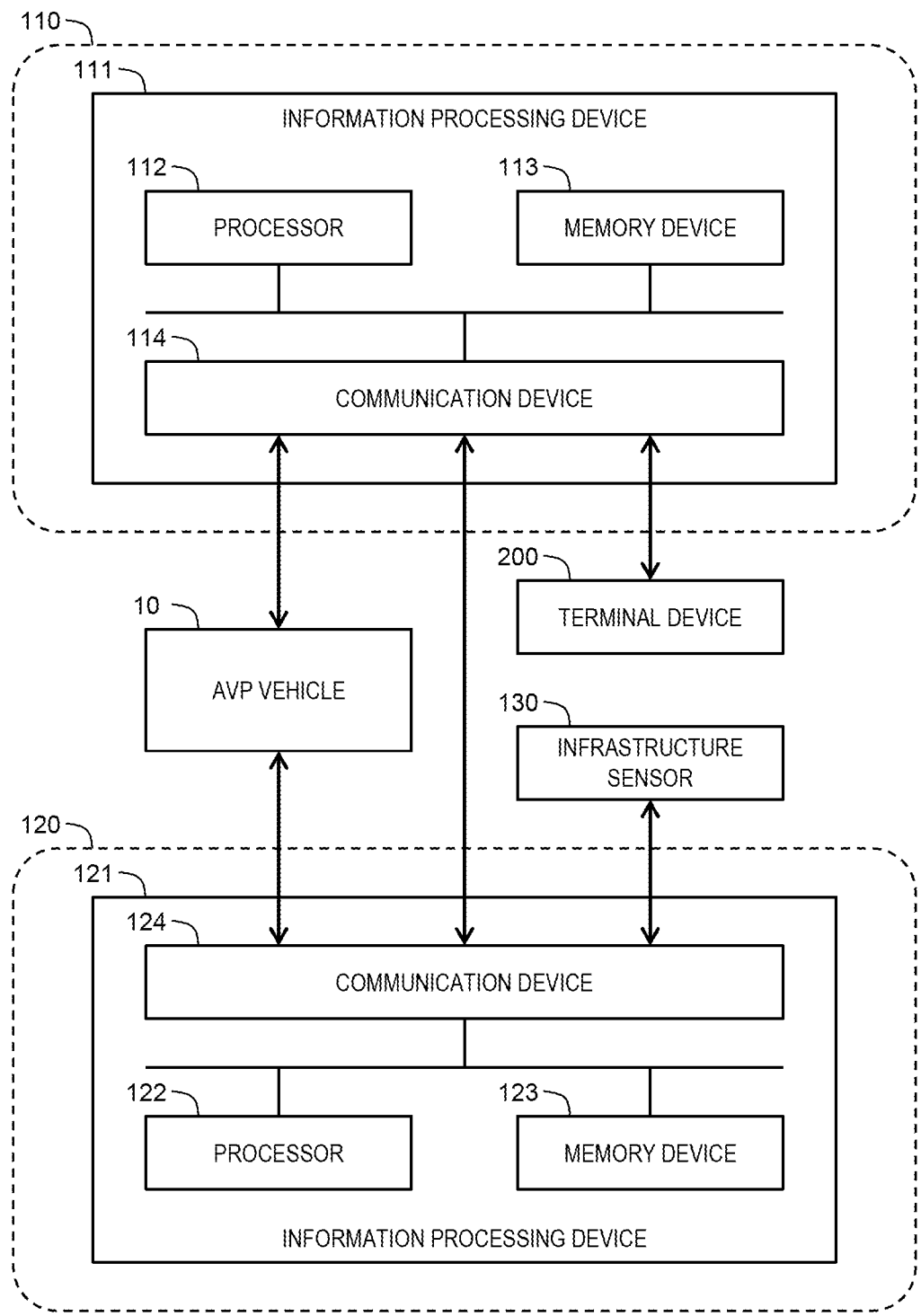
FIG. 14 is a block diagram showing a configuration example of the automated valet parking system according to an embodiment of the present disclosure.

FIG. 14 is a block diagram showing a concrete configuration example of the automated valet parking system 100 according to the present embodiment.

The vehicle management center 110 includes an information processing device 111 (a vehicle management server). The information processing device 111 includes a processor 112, a memory device 113, and a communication device 114. The memory device 113 stores a variety of information. Examples of the memory device 113 include a volatile memory, a nonvolatile memory, an HDD, and the like. The processor 112 executes a variety of information processing by executing a computer program stored in the memory device 113. The communication device 114 communicates with the control center 120, the AVP vehicle 10, and the terminal device 200 through communication networks.

The control center 120 includes an information processing device 121 (a control device). The information processing device 121 includes a processor 122, a memory device 123, and a communication device 124. The memory device 123 stores a variety of information. Examples of the memory device 123 include a volatile memory, a nonvolatile memory, an HDD, and the like. The processor 122 executes a variety of information processing by executing a computer program stored in the memory device 123. The communication device 124 communicates with the vehicle management center 110, the AVP vehicle 10, and the infrastructure sensor 130 through communication networks.

The processing by the automated valet parking system 100 according to the present embodiment is executed by at least one of the processor 112 of the vehicle management center 110 and the processor 122 of the control center 120. That is, the processing by the automated valet parking system 100 according to the present embodiment is executed by one or more processors (112, 122). Information necessary for the processing is stored in at least one of the memory device 113 of the vehicle management center 110 and the memory device 123 of the control center 120. That is, the information necessary for the processing is stored in one or more memory devices (113, 123).

6-2. Parking Lot Map Information

The parking lot map information MAP is stored in advance in the memory device 123 of the control center 120. The processor 122 of the control center 120 transmits the parking lot map information MAP to the AVP vehicle 10 via the communication device 124.

6-3. Processing Related to Information Providing Service

The one or more processors (112, 122) of the automated valet parking system 100 execute the processing related to the information providing service (see FIGS. 4 to 10).

6-3-1. Step S10

In the first example of Step S10 (see FIG. 6), the processor 122 of the control center 120 acquires the vehicle state information STA from the AVP vehicle 10 via the communication device 124. The vehicle state information STA is stored in the memory device 123. Then, the processor 122 acquires the braking result information BRK based on the vehicle state information STA. The braking result information BRK is stored in the memory device 123.

In the second example of Step S10 (see FIG. 7), the processor 122 of the control center 120 acquires the vehicle state information STA from the AVP vehicle 10 via the communication device 124. The vehicle state information STA is stored in the memory device 123. Moreover, the parking lot map information MAP is stored in the memory device 123 in advance. The processor 122 acquires the braking result information BRK based on the vehicle state information STA and the parking lot map information MAP. The braking result information BRK is stored in the memory device 123.

In the third example of Step S10 (see FIG. 8), the processor 122 of the control center 120 acquires the camera imaging information IMG from the infrastructure sensor 130 via the communication device 124. The camera imaging information IMG is stored in the memory device 123. Then, the processor 122 acquires the braking result information BRK based on the camera imaging information IMG. The braking result information BRK is stored in the memory device 123.

Furthermore, the processor 122 may transmit the braking result information BRK to the vehicle management center 110 via the communication device 124. The processor 112 of the vehicle management center 110 acquires the braking result information BRK from the control center 120 via the communication device 114. The braking result information BRK is stored in the memory device 113.

As a modification example, the braking result information BRK may be generated in the vehicle management center 110. In this case, the processor 122 of the control center 120 transmits necessary information (i.e., the vehicle state information STA, the parking lot map information MAP, the camera imaging information IMG) to the vehicle management center 110 via the communication device 124. The processor 112 of the vehicle management center 110 acquires the necessary information from the control center 120 via the communication device 114. Then, the processor 112 acquires the braking result information BRK based on the necessary information. The braking result information BRK is stored in the memory device 113.

As described above, the braking result acquisition unit 101 of the automated valet parking system 100 is realized by at least one of the processor 112 of the vehicle management center 110 and the processor 122 of the control center 120. The braking result information BRK is stored in at least one of the memory device 113 of the vehicle management center 110 and the memory device 123 of the control center 120.

6-3-2. Step S20

The acceptable range database ADB is stored in the memory device 113 of the vehicle management center 110. The processor 112 updates the acceptable range database ADB based on the braking result information BRK acquired in Step S10. In addition, the processor 112 acquires the acceptable range information ACP from the acceptable range database ADB. The acceptable range information ACP is stored in the memory device 113.

As a modification example, the acceptable range database ADB may be stored in the memory device 123 of the control center 120. The processor 122 updates the acceptable range database ADB based on the braking result information BRK acquired in Step S10. In addition, the processor 122 acquires the acceptable range database ADB from the acceptable range information ACP. The acceptable range information ACP is stored in the memory device 123. Furthermore, the processor 122 transmits the acceptable range information ACP to the vehicle management center 110 via the communication device 124. The processor 112 of the vehicle management center 110 acquires the acceptable range information ACP from the control center 120 via the communication device 114. The acceptable range information ACP is stored in the memory device 113.

As described above, the acceptable range acquisition unit 102 of the automated valet parking system 100 is realized by at least one of the processor 112 of the vehicle management center 110 and the processor 122 of the control center 120. The acceptable range information ACP is stored in at least one of the memory device 113 of the vehicle management center 110 and the memory device 123 of the control center 120.

6-3-3. Step S30, S40

In Step S30, the processor 112 of the vehicle management center 110 determines whether or not the braking performance of the AVP vehicle 10 deviates from the acceptable range based on the braking result information BRK and the acceptable range information ACP.

In Step S40, the processor 112 generates the notification information INF. The notification information INF is stored in the memory device 113. The notification information INF may include the additional service information ASV. An operational status of the additional service facility 7 is managed by the control center 120 and is provided from the control center 120. The processor 112 transmits the notification information INF to the terminal device 200 via the communication device 114.

As a modification example, the notification information INF may be generated in the control center 120. In Step S30, the processor 122 of the control center 120 determines whether or not the braking performance of the AVP vehicle 10 deviates from the acceptable range based on the braking result information BRK and the acceptable range information ACP. In Step S40, the processor 122 generates the notification information INF, and transmits the notification information INF to the vehicle management center 110 via the communication device 124. The processor 112 of the vehicle management center 110 acquires the notification information INF from the control center 120 via the communication device 114. The notification information INF is stored in the memory device 113. Furthermore, the processor 112 transmits the notification information INF to the terminal device 200 via the communication device 114.

As described above, the determination unit 103 and the notification unit 104 of the automated valet parking system 100 are realized by at least one of the processor 112 of the vehicle management center 110 and the processor 122 of the control center 120.

6-4. Processing Related to Additional Service

The one or more processors (112, 122) of the automated valet parking system 100 execute the processing related to the additional service shown in FIG. 12.

In Step S100, the processor 112 of the vehicle management center 110 receives the additional service request REQ from the terminal device 200 via the communication device 114.

In Step S110, the processor 112 communicates with the AVP vehicle 10 via the communication device 114 to activate the AVP vehicle 10 (ignition ON). Further, the processor 112 communicates with the control center 120 via the communication device 114 and instructs the control center 120 to execute the move processing. The processor 122 of the control center 120 transmits move processing instruction information to the AVP vehicle 10 via the communication device 124. The move processing instruction information indicates the additional service facility 7 being the destination. In response to the move processing instruction information, the AVP vehicle 10 automatically travels from the parking space 4 to the additional service facility 7.

When arriving at the destination (i.e., the additional service facility 7), the AVP vehicle 10 transmits an arrival notification to the control center 120. The processor 122 of the control center 120 receives the arrival notification from the AVP vehicle 10 via the communication device 124. The processor 122 transfers the arrival notification to the vehicle management center 110 via the communication device 124. The processor 112 of the vehicle management center 110 receives the arrival notification from the control center 120 via the communication device 114. Then, the processor 112 communicates with the AVP vehicle 10 via the communication device 114 to deactivate the AVP vehicle 10 (ignition OFF).

Step S130 is similar to Step S110. However, the destination is the original parking space 4.

What is claimed is:

1. An automated valet parking system that provides an automated valet parking service in a parking lot, wherein a vehicle supporting the automated valet parking service executes braking control so as to automatically decelerate and stop before a target stop position that is set in the parking lot, the automated valet parking system comprising:

one or more processors; and one or more memories configured to store braking result information that indicates a braking distance until the vehicle is stopped by the braking control or an error distance between the target stop position and an actual stop position at which the vehicle is stopped, wherein the one or more processors are configured to:

determine whether or not the braking distance or the error distance indicated by the braking result information deviates from an acceptable range; and when the braking distance or the error distance indicated by the braking result information deviates from the acceptable range, decide that an abnormality occurs in a braking device or a tire of the vehicle and transmit notification information notifying occurrence of the abnormality to a terminal device operated by a user of the vehicle.

2. The automated valet parking system according to claim 1, wherein the automated valet parking service includes an additional service that performs at least one of inspection, repair, and tire change during a period in which the vehicle is left in the parking lot, and the notification information includes additional service information that proposes to perform the additional service.

3. The automated valet parking system according to claim 1, wherein the braking result information indicates the braking distance, and the one or more processors are further configured to:

acquire vehicle state information indicating a position and a travel state of the vehicle from the vehicle; and calculate the braking distance based on the vehicle state information to acquire the braking result information.

4. The automated valet parking system according to claim 1, wherein the braking result information indicates the error distance, the one or more memories further store parking lot map information indicating the target stop position in the parking lot, and the one or more processors are further configured to:

acquire vehicle state information indicating a position and a travel state of the vehicle from the vehicle;

recognize the actual stop position based on the vehicle state information; and calculate the error distance based on the target stop position indicated by the parking lot map information and the actual stop position to acquire the braking result information.

5. The automated valet parking system according to claim 1, wherein the braking result information indicates the error distance, a camera that images the target stop position and its surroundings is installed in the parking lot, the one or more processors are further configured to:

acquire camera imaging information including an image imaged by the camera;

analyze the image indicated by the camera imaging information to identify the vehicle and the target stop position and identify a position at which the vehicle is stopped as the actual stop position, and calculate the error distance based on the actual stop position and the target stop position to acquire the braking result information.

6. The automated valet parking system according to claim 1, wherein the one or more processors are further configured to set the acceptable range based on a history of the braking result information regarding the vehicle or another vehicle of a same vehicle type as the vehicle.

7. A service providing method that provides an automated valet parking service in a parking lot, wherein a vehicle supporting the automated valet parking service executes braking control so as to automatically decelerate and stop before a target stop position that is set in the parking lot, the service providing method comprising:

acquiring braking result information that indicates a braking distance until the vehicle is stopped by the braking control or an error distance between the target stop position and an actual stop position at which the vehicle is stopped;

determining whether or not the braking distance or the error distance indicated by the braking result information deviates from an acceptable range; and when the braking distance or the error distance indicated by the braking result information deviates from the acceptable range, deciding that an abnormality occurs in a braking device or a tire of the vehicle and transmitting notification information notifying occurrence of the abnormality to a terminal device operated by a user of the vehicle.

8. The service providing method according to claim 7, wherein the automated valet parking service includes an additional service that performs at least one of inspection, repair, and tire change during a period in which the vehicle is left in the parking lot, and the notification information includes additional service information that proposes to perform the additional service.

* * * * *